Feb. 1, 1966   D. G. SOUSSLOFF ETAL   3,232,218
PROCESS OF SEPARATING AN ICE-BRINE SLURRY
Filed Dec. 22, 1961   3 Sheets-Sheet 1

INVENTORS.
DIMITRI G. SOUSSLOFF
THEODORE DESCOVICH
EDWARD L. RAKOWSKY
BY Arthur J. Plantamura
ATTORNEY.

Feb. 1, 1966  D. G. SOUSSLOFF ETAL  3,232,218
PROCESS OF SEPARATING AN ICE-BRINE SLURRY
Filed Dec. 22, 1961  3 Sheets-Sheet 2

INVENTORS.
DIMITRI G. SOUSSLOFF
THEODORE DESCOVICH
EDWARD L. RAKOWSKY
BY Arthur J. Plantamura
ATTORNEY.

Feb. 1, 1966 D. G. SOUSSLOFF ETAL 3,232,218
PROCESS OF SEPARATING AN ICE-BRINE SLURRY
Filed Dec. 22, 1961 3 Sheets-Sheet 3

INVENTORS.
DIMITRI G. SOUSSLOFF
THEODORE DESCOVICH
EDWARD L. RAKOWSKY
BY
Arthur J. Plantamura
ATTORNEY.

United States Patent Office 3,232,218
Patented Feb. 1, 1966

3,232,218
PROCESS OF SEPARATING AN ICE-BRINE SLURRY
Dimitri G. Soussloff, Weston, and Theodore Descovich, Springdale, Conn., and Edward L. Rakowsky, Palisades Park, N.J., assignors to American Machine & Foundry Company, a corporation of New Jersey
Filed Dec. 22, 1961, Ser. No. 161,615
2 Claims. (Cl. 100—37)

This invention relates to a method and apparatus for separating solids from liquids wherein the liquid is partially frozen and the ice crystals are separated from the liquid part of the ice-liquid mixture. More particularly, the invention is concerned with making potable water from sea water or from water supplies characterized as brackish or otherwise unsuitable for drinking and/or for agricultural use.

The invention will be described in conjunction with the desalting of water but it will be understood that the invention is applicable for use with other liquids which it is sought to treat, e.g. concentrate, purify recover solids therefrom, etc.

Desalting of water by first freezing the brine and thereafter separating the lower melting point liquid salt concentrate from the relatively pure ice crystals is known. The freezing approach for purification of water is often cited as the most promising and economically practical method for conversion of sea water. This method has the advantage of an inherently low energy requirement and the process may be accomplished at or near atmospheric pressures and at low temperatures which minimize scaling and corrosion. Additionally, the freezing process has the advantage of low cost materials and it utilizes equipment of relatively small size for large capacity conversion plants of the order of 10 million gallons per day. This is a very substantial advantage in the construction of commercial size units.

One of the major problems associated with freezing processes, however, is a practical technique for the separation of ice crystals from the brine. Although various procedures for separation of the brine from the ice crystals have been proposed, e.g. counter-current washing, centrifuging, or controlled nucleation and growth of ice crystals, no process for the effective separation of ice crystals from the mother liquor has been established as being commercially practicable so as to produce water having a solids content in the order of 500 p.p.m. or less. Although various freezing processes proposed have been demonstrated to be practical on a small or laboratory scale, attempts to scale up to useful size has presented a host of problems which have thus far precluded satisfactory large scale or commercial size units.

The present invention is concerned with a process for separating brine from sea water wherein the partially frozen brine or slush is compressed in thin layers in a continuous manner between converging moving surfaces such as solid or perforated rollers or between solid, perforated or screen conveyor belts which provide increasingly greater pressure on the partially frozen brine or slush. The speed at which these surfaces move the layer of ice therebetween may be as high as about 5,000 feet per minute; the speed being a direct function of the compression time, i.e. the greater the area of direct compression on the ice layer, the faster the permissible travel of the continuous ice layer. The speed at which the liquid-brine squeezed from the ice layer is removed is dependent on the area of compression as well as on the travel of the layer. The result of the compressive action on the ice slush layer is to collapse the ice crystals and reduce the void volume, thereby reducing the amount of brine contained in the ice layer to a minimal amount. The squeezed liquid ice slush provides a substantially pure ice film (having less than 500 p.p.m. total salt and other solids). Drainage of the concentrated brine from the ice layer under compression is aided by providing a perforated surface at least at the vicinity of greatest compressive force on the slush. Removal of concentrated brine may also be aided by applying vacuum at various places on the slush and preferably at those points of where the ice layer is subjected to highest pressure and produces a greater amount of liquid. The ice layer produced from the compressive operation is subsequently melted to provide substantially pure water, i.e. containing 500 p.p.m. or less combination of salt and other solids sought to be removed by the purification treatment.

It is a primary object of the present invention to provide a continuous process for the isolation of constituents of a liquid by separating the liquid from the ice crystals in a mixture obtained by partial freezing of the liquid to be processed.

It is a more specific object of the invention to provide a continuous process for the separation of concentrated liquid brine from a mixture of the brine and pure ice crystals which is obtained by the partial freezing of brackish or salt water.

It is another object of the invention to provide a novel process wherein an ice-brine slush is subjected in a continuous manner to compressive forces to remove brine contained in the slush and associated with the ice crystals.

It is a further and particularly preferred object of the invention to provide a novel process for the production of relatively fresh water from an ice-liquid mixture wherein the mixture is subjected to a gradually increasing squeezing operation between at least one pair of rollers of a pair of moving conveyor belts or a roller and a conveyor belt, to extract the brine liquids from an ice layer.

It is a further and alternate object of the invention to provide a novel method wherein an ice-liquid slush is continuously subjected to gradually increasing compressive forces while vacuum is simultaneously applied to said compressed slush to remove the occluded concentrated brine on the surface of the ice crystals.

It is still a further object of the invention to provide a novel method for the in situ formation of a thin layer of ice on a moving cold perforate surface or belt which allows the non-ice liquid portion to pass through the belt while the ice formed is retained on the belt.

Other objects and advantages will become apparent as the description of the invention is presented in greater detail hereinbelow.

In carrying out the method of the invention, reference is had to the following description taken in conjunction with the accompanying flow sheets in which.

Figure 1:
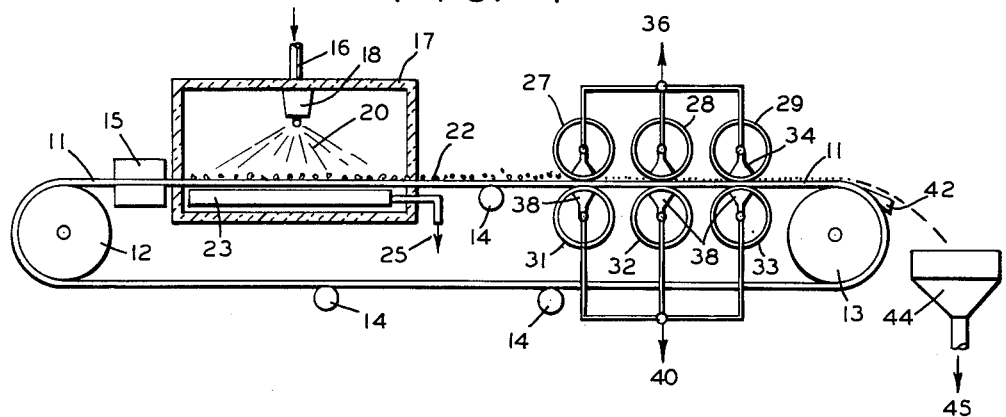
FIG. 1 illustrates one embodiment of the process of the present invention in which the liquid to be treated is sprayed onto a cold foraminous moving belt and the resulting ice film is compressed to squeeze out additional liquid.

Referring in detail to FIG. 1 of the drawing, a conveyor system comprises a foraminous belt 11 upon which an ice layer is treated. The conveyor belt 11 is suitably supported and driven in a conventional manner by rollers 12 and 13. To provide auxiliary support, rollers 14, suitably spaced, may be employed. The belt 11 upon which the ice layer 22 is deposited is maintained at a temperature preferably near freezing at all times, i.e. between about —10° C. and about 5° C. Prior to deposition of the ice layer upon the belt, the belt 11 is first preferably passed through a precooler 15 in order to lower the temperature sufficiently to promote ice formation in the spray compartment 17.

The liquid to be treated is fed into the compartment 17 through a suitable conduit 16 and spray unit 18 and sprayed as a mist 20 onto the surface of the belt 11. The temperature in the compartment 17 is preferably maintained so that the liquid spray is partially transformed into ice substantially instantaneously as it comes into contact with the belt 11. This is effected by maintaining the temperature in the compartment 17 as well as that of the belt 11 sufficiently low, i.e. below about —5° C. The temperature, it will be apparent, depends on the quantity of spray, speed of the belt, etc. Situated beneath the belt 11 and within the compartment 17 is a vacuum box 23 connected by means of the conduit 25 to a suitable vacuum generating source (not shown). As the spray 20 is deposited upon the belt 11, ice crystals 22 are retained upon the surface of the belt 11 while the liquid residue which is not converted to ice crystals and is now more concentrated passes through the foraminous belt 11 aided by the vacuum arrangement 23. The layer or film of ice emerging from the compartment 17 may be sufficiently conditioned to be useful for some applications. It may be further treated by passage through a system of converging surfaces to squeeze additional liquid from the ice. For this purpose, a plurality of upper rollers designated 27, 28 and 29 may be employed. These rollers, in conjunction with the conveyor belt 11 backed by rollers 31, 32 and 33, exert a compressive force on the ice layer. It will be apparent that rollers 27, 28 and 29 may be replaced with a single roller or the rollers may carry thereon a perforated conveyor belt. In conjunction with the compressive force exerted by the rollers, each of the rollers preferably contains a stationary vacuum box 34 for each of the upper set of rollers and vacuum box 38 for the lower set of rollers through which liquid squeezed from the layers is removed through the vacuum systems 36 and 40, respectively. The compressed relatively Dry Ice layer is then doctored off at 42 and melted in a suitable arrangement 44 to produce substantially pure liquid 45.

Figure 2:
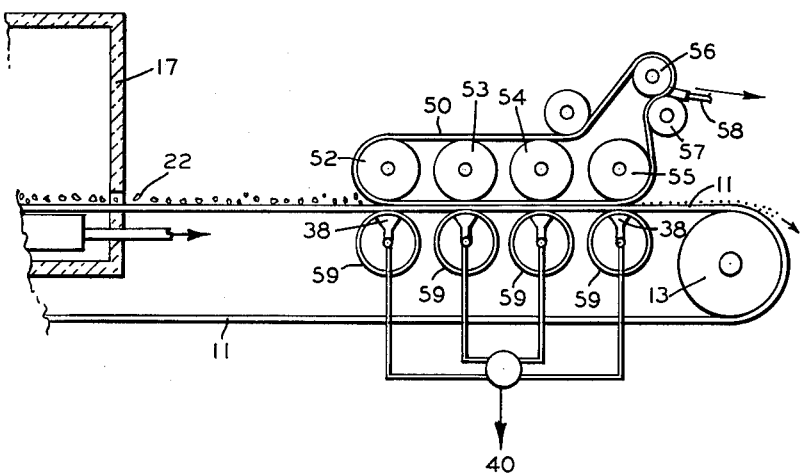
FIG. 2 illustrates a modified arrangement in which the ice film is continuously squeezed between the foraminous depositing conveyor and an upper felt conveyor.

The embodiment illustrated in FIG. 2 shows substantially the arrangement of FIG. 1 with the exception that an upper conveyor 50 of absorbing material such as felt is utilized in lieu of the upper set of rollers in FIG. 1. As shown in FIG. 2, the ice layer 22 formed in the compartment 17 is conveyed by the belt 11 between the conveyor 50 which is guided and driven by a series of rolls 52, 53, 54 and 55. Suitably deposited in a like manner as the rollers 31, 32 and 33 of FIG. 1, is a series of rollers 59 suitably provided with vacuum boxes 38 connected to a vacuum system (not shown) through the line 40. As the ice layer passes between the conveyor 11 and the felt conveyor 50, the force exerted squeezes liquid from the ice. The liquid is rapidly absorbed by means of the blotting effect of the felt conveyor 50 aided by vacuum through box 38. Illustrated at 56 and 57 is a pair of squeezer rollers for the purpose of removing the liquid from the felt conveyor 50 through line 58 although any conventional arrangement suitable for this purpose may be used.

Figure 3:
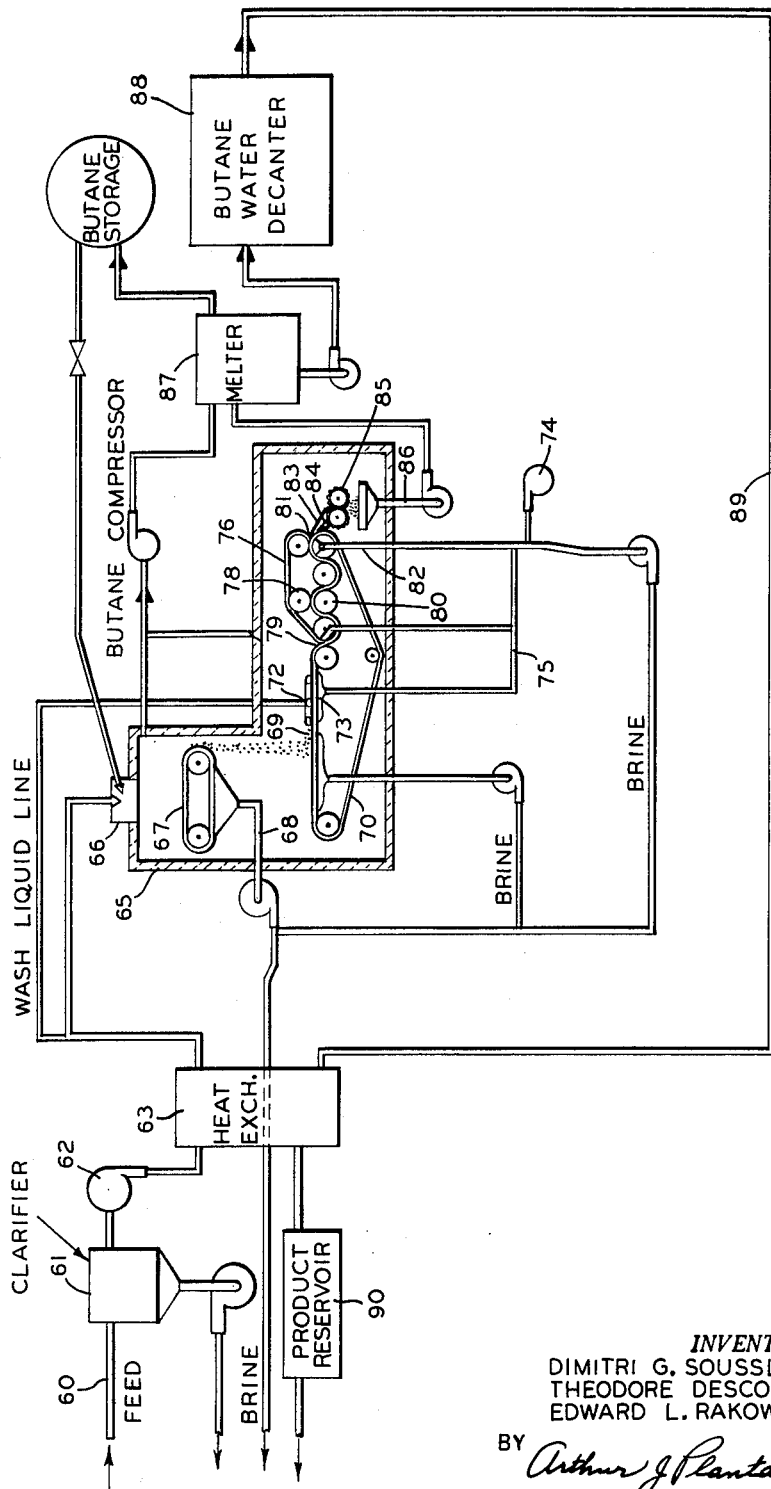
FIG. 3 illustrates a full flow diagram, which includes another embodiment of the invention, wherein a series of seven compressive rollers are utilized in conjunction with conveyor belts over the rollers in compressing the brine slush.
Figure 4:
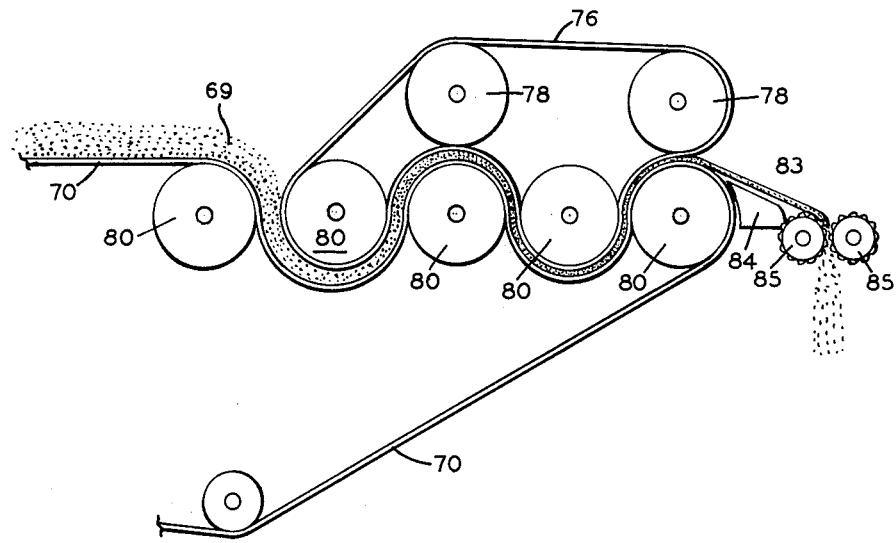
FIG. 4 is an enlarged view of the conveyor belts and compressive rollers section of the system depicted in FIG. 3 illustrating more distinctly the path of the ice layer between the conveyor belts.

Referring to FIGS. 3 and 4, liquid supply such as saline water 60 is fed to a clarifier 61 and from there pumped at 62 through a suitable heat exchanger 63 into a freezing compartment 66 of the insulated enclosure 65, where the brine is frozen to an extent of from about 25–75%, preferably between 40 and 60%. The present invention is essentially concerned with separation of the ice from the ice liquid mixture, and in FIG. 3, this separation is effected within the enclosure 65. Any suitable means known in the art for freezing of the liquid to be separated may be utilized. As such, for example, is the process utilizing liquid butane evaporated in admixture with a precooled brine in an open chamber. This freezing operation as well as other suitable means are described, for example, in the United States Department of Interior, Research and Development Progress Reports Nos. 40 and 41, in which the technique for utilizing liquid butane and other organic materials for direct freezing of the liquid is disclosed. The procedures generally utilize liquid butane or other organic hydrocarbon which is flashed under a slight vacuum with sea water to produce an ice brine slush mixture. Another means for freezing the brine, which may be employed, is the vacuum freezing technique disclosed in the United States Department of Interior, Research and Development Progress Report No. 32, at page 4.

The insulated enclosure 65 although not indispensable, provides a definite economic advantage, particularly in warmer climates. As a practical matter, the liquid to be treated is frozen to the minimum stage and the enclosure 65 retains the ice in a solid state until the liquid is separated therefrom.

The brine partially frozen at 66 in gravity fed onto the auxiliary conveyor 67 where the liquid is drained at 68 and by suitable means, such as shaker or spreader (not shown), and is deposited as a fairly uniform layer 69 upon the conveyor 70 in a substantially uniform layer. If desired, the layer 69 may be washer in a suitable manner as shown at 72 to free the ice of the more concentrated liquid. For this purpose, sea water, which contains relatively less solids, may be used. The ice layer is optionally subjected to vacuum at 73 connected to a vacuum source 74 through line 75. The ice layer subsequently passes through a tortuous passage formed by the arrangement of an upper conveyor 76 in conjunction with the lower conveyor 70. The upper conveyor 76 is wound around a plurality of upper rollers 78 as well as several of the lower rollers 80 which carry the lower conveyor 70. The rollers are so arranged that the conveyor belts and the rollers, especially at their various places of direct pressure between pair rollers backing up the conveyor belt or screen, provide a gradually increasing pressure so that at the point 81, the pressure is preferably in the vicinity of about 1,000 to about 2,000 p.s.i. while at the point 79 a pressure is of the order of about 40 to 120 p.s.i. The conveyor belts through which the ice is passed are preferably of the foraminous or screen type permitting the passage therethrough of the liquid squeezed from the ice layer. When compressor rollers are utilized, in the absence of conveyors thereon, it is recommended that they be relatively large in diameter compared to the depth of the ice layer being processed and that the ice layer preferably be fed thereto after being suitably packed or shaped to provide for more even feeding.

In a more specific embodiment, the ice at least at the highest point of compression 81 is subjected to a vacuum 82 to optimize removal of liquid from the ice layer. It is preferred, where suitable and economically justified, that vacuum be applied at the several points of more direct compression where the amounts of liquid squeezed from the ice layer are larged.

The resulting ice layer 83 is removed from the conveyor belt 70 such as by doctor blade 84, crushed in a suitable manner as by breaker rollers 85 (see FIG. 4)

and conveyed or pumped through the conduit 86 to a melter 87. The ice may be melted by any suitable means such as by passing butane vapor at slight pressure through the ice at 87 for example, thus condensing the butane. The product water is separted from any residual butane by decantation at 88 and the liquid butane is recycled to the freezer. The product water is thereafter passed through the line 89 and heat exchanger 63 to storage 90.

Figure 5:
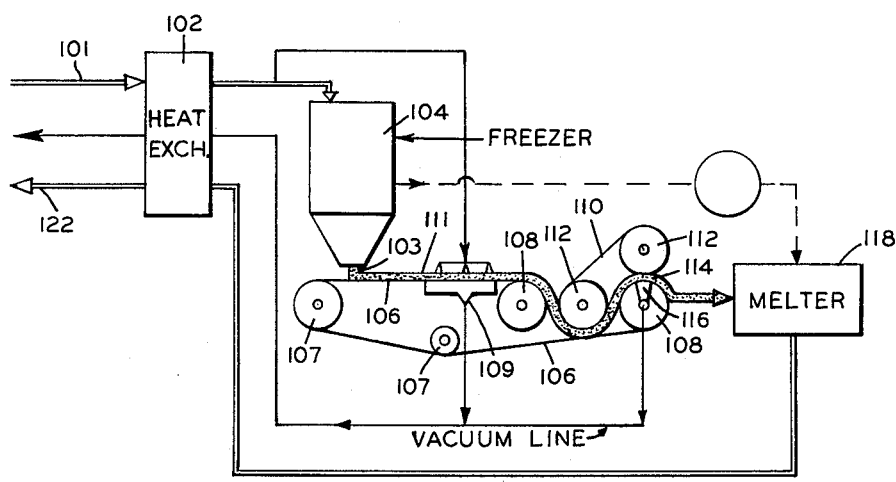
FIG. 5 is still another alternate configuration in which the pressure conveyor belt and roller arrangement utilized in separating the brine occluded on the surface of the ice crystals comprises a single upper roller.

In FIG. 5, a modified configuration is illustrated in which two rollers are employed to carry the upper conveyor. Sea water enters at 101 through a heat exchanger 102 and thence to the freezing compartment 104. The partially frozen liquid 103 comprising a mixture of ice crystals (composed of substantially pure water and concentrated liquid) is deposited as by extrusion under vacuum, which effectively removes substantial amounts of water from the slush, onto the conveyor screen 106. The conveyor 106 is wound around a plurality of pressure exerting rollers 108 and guide rollers 107. If desired, the deposited layer may be subjected to vacuum at 109. The slush layer 111 in its continuous movement passes between said conveyor screen 106 and a second conveyor 110 which is wound around a pair of rollers 112 and so arranged as to provide increasing pressure to the ice layer 111 sandwiched between the conveyor belts 106 and 110. After subjecting the layer to the greatest pressure at point 114, while preferably applying vacuum at 116, the substantially dried ice layer 111 is appropriately doctored off or otherwise lifted from the endless belt 106 and conveyed to a melter 118. After decantation, where appropriate as to remove butane residue, the liquid melt is circulated through the heat exchanger 102 to the fresh water storage 122.

It will be understood that although certain details have been illustrated and described for suitably carrying out the invention, various modifications apparent to those skilled in the art may be made without departing from the present inventive contribution. Thus, although certain arrangement of conveyors backed up by rollers have been described, various other suitable configurations may be employed. Also, while wire mesh or perforate endless conveyors and perforate pressure rollers are preferred, imperforate conveyor belts may also be employed in lieu of, or in combination with, perforate units. Moreover, while the invention, in its preferred embodiment, contemplates usage of vacuum at least at pressure points backed up by rollers and in particular vacuum through the rollers, various advantages of the invention may be secured in the absence of vacuum. Likewise, in processing the ice layer formed from the ice and liquid mixture, a wash for said layer at any suitable place along the line may be employed to rinse the occluded relatively concentrated brine from the ice crystal's surface. For this purpose, either the starting liquid or product liquid may be utilized.

The pressure rollers herein referred to have been described of conventional metal type having a smooth surface with the exception of perforations where employed. However, it is also contemplated that one or more of the rollers in the combination may have a knurled surface or may be of inflated type which comprises a flexible material, such as rubber or other suitable compositions.

The invention has been described primarily in conjunction with the separation of a mixture of ice crystals and brine, but it will be apparent that the inventive concept, with suitable and obvious modifications, will readily lend itself to the separation of other mixtures, e.g. concentration of a variety of liquids such as fruit juices, beer, wine, etc., by removal of ice (water) crystals from a frozen mixture producing a liquid relatively high in solids.

We claim:

1. A method for separating a mixture of ice and liquid brine which comprises continuously feeding a layer of said mixture between coverging surfaces comprising a pair of endless conveyors backed up by pressure rollers in which at least the lower conveyor is perforate and is backed up, at least at the point of greatest pressure, by a perforate roller, the feeding of said layer through said converging surfaces being conducted to produce from said mixture a thin planar film of ice, said layer being subjected to vacuum applied through said perforate roller as said layer is compressed to remove free liquid therefrom.

2. The method of claim 1 in which said layer is washed with a liquid, which is relatively less concentrated than the liquid contained in said mixture, before subjecting said layer to pressure applied by said converging surfaces.

References Cited by the Examiner

UNITED STATES PATENTS

| | | |
|---|---|---|
| 491,545 | 2/1893 | Gerard. |
| 1,661,489 | 3/1928 | Meynardie _____ 62—100 X |
| 1,865,614 | 7/1932 | Caldwell _____ 62—100 X |
| 1,917,659 | 7/1933 | Marshall. |
| 1,958,279 | 5/1934 | Morgan. |
| 1,976,204 | 10/1934 | Voohrees. |
| 2,009,283 | 7/1935 | Warner _____ 62—71 |
| 2,064,512 | 12/1936 | Wilson. |
| 2,317,777 | 4/1943 | Krause _____ 62—341 X |
| 2,324,869 | 7/1943 | Oman _____ 100—151 X |
| 2,477,959 | 8/1949 | Brown _____ 159—47 X |
| 2,756,668 | 7/1956 | Leed _____ 100—37 |
| 2,780,281 | 2/1957 | Reinert _____ 159—48 |
| 2,921,444 | 1/1960 | Bump et al. _____ 62—346 X |
| 3,024,117 | 6/1962 | Barlow. |

FOREIGN PATENTS

| | | |
|---|---|---|
| 806,727 | 12/1958 | Great Britain. |
| 841,374 | 7/1960 | Great Britain. |

NORMAN YUDKOFF, *Primary Examiner.*

RICHARD A. O'LEARY, *Examiner.*